United States Patent
Zohar

(10) Patent No.: US 11,061,103 B1
(45) Date of Patent: Jul. 13, 2021

(54) NAVIGATION SYSTEM, DEVICE AND METHOD USING UNSYNCHRONIZED NODES

(71) Applicant: iSeeLoc Inc., San Jose, CA (US)

(72) Inventor: Avi Zohar, Ramat Ha-Sharon (IL)

(73) Assignee: iSeeLoc, Inc., San Jose, CA (US)

( * ) Notice: Subject to any disclaimer, the term of this patent is extended or adjusted under 35 U.S.C. 154(b) by 420 days.

(21) Appl. No.: 15/892,092

(22) Filed: Feb. 8, 2018

Related U.S. Application Data

(60) Provisional application No. 62/457,717, filed on Feb. 10, 2017.

(51) Int. Cl.
| | |
|---|---|
| *G01S 5/10* | (2006.01) |
| *G01S 5/02* | (2010.01) |
| *G01C 21/20* | (2006.01) |
| *G01C 21/00* | (2006.01) |

(52) U.S. Cl.
CPC ............ *G01S 5/10* (2013.01); *G01S 5/02216* (2020.05); *G01C 21/005* (2013.01); *G01C 21/20* (2013.01); *G01S 5/021* (2013.01)

(58) Field of Classification Search
CPC ......... G01S 5/10; G01S 5/021; G01C 21/005; G01C 21/20
See application file for complete search history.

(56) References Cited

U.S. PATENT DOCUMENTS

| | | | |
|---|---|---|---|
| 3,264,644 A | 8/1966 | Jacob | |
| 4,481,519 A | 11/1984 | Margerum | |
| 4,636,796 A | 1/1987 | Imazei | |
| 4,800,541 A | 1/1989 | Farmer et al. | |
| 5,093,649 A | 3/1992 | Johnson | |
| 5,128,925 A * | 7/1992 | Dornstetter | ........... H04W 64/00 |
| | | | 370/336 |
| 5,173,709 A | 12/1992 | Lauro et al. | |
| 5,214,436 A | 5/1993 | Hannan | |
| 5,220,332 A * | 6/1993 | Beckner | ................... G01S 11/02 |
| | | | 342/125 |
| 5,266,958 A | 11/1993 | Durboraw, III | |
| 5,361,072 A | 11/1994 | Barrick et al. | |
| 5,381,444 A | 1/1995 | Tajima | |
| 5,610,612 A | 3/1997 | Piper | |
| 5,689,274 A | 11/1997 | Rose | |

(Continued)

FOREIGN PATENT DOCUMENTS

| | | | |
|---|---|---|---|
| KR | 2008002992 | 7/2008 | |
| WO | WO2007123487 A1 | 11/2007 | |
| WO | WO-2014124785 A1 * | 8/2014 | ........... G01S 13/343 |

OTHER PUBLICATIONS

Xu et al. "High Accuracy TDOA-Based Localization without Time Synchronization." IEEE Trans. On Parallel and Distributed Systems. Vo, 24, No. 8. Aug. 2013. pp. 1567-1576. (Year: 2013).*

(Continued)

*Primary Examiner* — Gregory C. Issing
(74) *Attorney, Agent, or Firm* — Haverstock & Owens LLP

(57) ABSTRACT

A system, device and method that enables at least two unsynchronized units with known locations and an unsynchronized unit having an unknown location to communicate with each other and to be a part of enabling navigation by the unit having the unknown location by determining time difference of arrivals of signals between the units.

42 Claims, 4 Drawing Sheets

(56) References Cited

U.S. PATENT DOCUMENTS

| | | | |
|---|---|---|---|
| 5,701,328 A * | 12/1997 | Schuchman | G01S 1/68 |
| | | | 375/139 |
| 5,715,530 A | 2/1998 | Eul | |
| 5,722,064 A | 2/1998 | Campana, Jr. | |
| 5,724,047 A | 3/1998 | Lioio et al. | |
| 5,815,117 A | 9/1998 | Kolanek | |
| 5,945,947 A | 8/1999 | Cuningham | |
| 5,982,322 A | 11/1999 | Bickley et al. | |
| 6,275,705 B1 * | 8/2001 | Drane | H04W 64/00 |
| | | | 455/456.2 |
| 6,307,380 B1 | 10/2001 | Hirai et al. | |
| 6,459,415 B1 | 10/2002 | Pachal et al. | |
| 6,493,539 B1 * | 12/2002 | Falco | H04B 7/2687 |
| | | | 455/67.11 |
| 6,529,142 B2 | 3/2003 | Yeh et al. | |
| 6,556,942 B1 | 4/2003 | Smith | |
| 6,573,683 B2 | 6/2003 | Chang | |
| 6,646,601 B2 | 11/2003 | Samson | |
| 6,812,824 B1 | 11/2004 | Goldinger et al. | |
| 7,286,624 B2 * | 10/2007 | Woo | G01S 5/021 |
| | | | 375/356 |
| 7,289,425 B2 | 10/2007 | Yeh et al. | |
| 7,379,015 B2 | 5/2008 | Workman | |
| 7,409,226 B1 | 8/2008 | Stevenson | |
| 7,428,450 B1 | 9/2008 | Oberg | |
| 7,595,755 B2 | 9/2009 | Newton et al. | |
| 7,719,994 B2 | 5/2010 | Zumsteg | |
| 7,917,155 B2 | 3/2011 | Karr et al. | |
| 8,054,225 B2 | 11/2011 | Sim et al. | |
| 8,063,826 B2 * | 11/2011 | Ameti | G01S 5/0009 |
| | | | 342/463 |
| 8,125,372 B2 | 2/2012 | Focke et al. | |
| 8,543,132 B2 * | 9/2013 | Nam | G01S 5/14 |
| | | | 455/404.2 |
| 8,639,462 B2 | 1/2014 | Buccafusca | |
| 8,818,406 B2 * | 8/2014 | Bevan | H04W 64/003 |
| | | | 455/456.1 |
| 9,277,369 B2 * | 3/2016 | Lindskog | G01S 13/765 |
| 9,389,297 B2 | 7/2016 | Zohar et al. | |
| 9,733,345 B2 | 8/2017 | Zohar et al. | |
| 9,983,292 B2 * | 5/2018 | Hach | G01S 5/021 |

| | | | |
|---|---|---|---|
| 2002/0089445 A1 | 7/2002 | Odashima et al. | |
| 2003/0141973 A1 | 7/2003 | Yeh et al. | |
| 2005/0259568 A1 | 11/2005 | Yeh et al. | |
| 2006/0088042 A1 | 4/2006 | Shoham et al. | |
| 2006/0148423 A1 | 7/2006 | Sharpe | |
| 2008/0102859 A1 | 5/2008 | Karr et al. | |
| 2008/0309765 A1 | 12/2008 | Dayan et al. | |
| 2009/0085796 A1 | 4/2009 | Kuroda et al. | |
| 2009/0289844 A1 | 11/2009 | Palsgrove et al. | |
| 2010/0008270 A1 * | 1/2010 | Ahn | G01S 11/02 |
| | | | 370/310 |
| 2010/0033365 A1 | 2/2010 | Kishida et al. | |
| 2010/0109933 A1 | 5/2010 | Rhodes et al. | |
| 2010/0151886 A1 | 6/2010 | Swope et al. | |
| 2010/0207820 A1 | 8/2010 | Kawano et al. | |
| 2010/0234044 A1 | 9/2010 | Lohbihler | |
| 2012/0283987 A1 | 11/2012 | Busking | |
| 2013/0021206 A1 * | 1/2013 | Hach | G01S 5/06 |
| | | | 342/451 |
| 2014/0187259 A1 * | 7/2014 | Kakani | G01S 11/02 |
| | | | 455/456.1 |
| 2015/0063138 A1 * | 3/2015 | Aldana | G01S 5/10 |
| | | | 370/252 |
| 2016/0327630 A1 * | 11/2016 | Mutz | G01S 5/10 |

OTHER PUBLICATIONS

Zietek. "Improved Method for TDOA Estimation with Chirp Signals". Institute of Radioelectronics, Warsaw University of Technology, Warsaw, Poland, pp. 32-35, 2011. (Year: 2011).*

Zietek, P. "improved Method For TDOA Estimation with Chirp Signals." Electronics and Information Technologies. 41st European Microwave Conference . p. 32-35. 2011 (Year: 2011).*

Wang et al. "Indoor Localization System with Asynchronous Acoustic Beacon." https://www.microsoft.com/en-US/research/wp-content/uploads/2016/11/WLZZ_YuTingWang.pdf. Nov. 2016 (Year: 2016).*

Phillips et al.,"A New Excitation Method: Combining Burst Random Excitation with Cyclic Averaging", IMAC 1999.

Phillips et al., "Frequency Resolution Effects on FRF Estimation: Cyclic Averaging vs. Large Block Size", IMAC 1999.

Louis E. Frenzel, "Printed-Circuit-Board Antennas", Electronic Design, Mar. 2005.

* cited by examiner

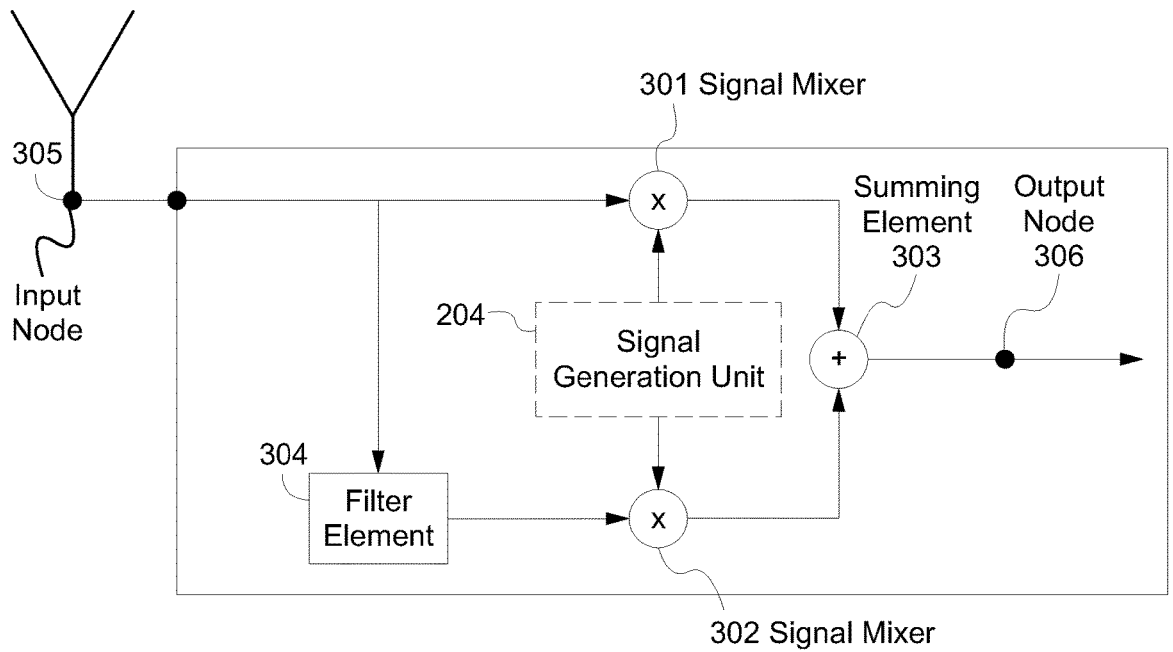

Fig. 3

| |
|---|
| A first anchored device transmits a first local ranging signal to the a second anchored device and a receiver device when its internal clock reaches two specified times t1 and t4. ⎫ 402 |
| The second anchored device transmits a second local ranging signal to the first anchored device and the receiver device when its clock reaches two specified times t2 and t3. ⎫ 404 |
| The receiver device and the anchored devices each determine time shifts between their local ranging signal and each of the received local ranging signals. ⎫ 406 |
| The anchored devices transmit their measured time shifts to the receiver device. ⎫ 408 |
| The receiver device determines a compensated for un-synchronization time difference of arrival between signals received from the first anchored device and the second anchored device based on its measured time shifts and the time shifts received from the anchored devices. ⎫ 410 |

Fig. 4

NAVIGATION SYSTEM, DEVICE AND METHOD USING UNSYNCHRONIZED NODES

RELATED APPLICATIONS

The application claims priority of U.S. provisional application, Ser. No. 62/457,717, filed Feb. 10, 2017, and entitled "TIME DIFFERENCE OF ARRIVAL (TDOA) MEASUREMENT WITH UNSYNCHRONIZED NODES AND DYNAMIC RECEIVER," which is hereby incorporated by reference.

FIELD OF THE INVENTION

The present invention is related to navigation using unsynchronized nodes. More particularly, the present invention is related to a system, device and method for navigating using unsynchronized nodes via determining a time difference of arrival (TDOA) of signals between a receiver device and a plurality of unsynchronized base units.

BACKGROUND OF THE INVENTION

The technique of multilateration for navigation is possible by the determination of the TDOA of signals sent between nodes of the system. However, problems arise when one or more of the nodes are not synchronized and/or as a result of drift in the node clocks. As a result, the range differences used by the multilateration is inaccurate and not suitable for some navigation applications.

SUMMARY OF THE INVENTION

A system, device and method that enables at least two unsynchronized units with known locations and an unsynchronized receiver unit having an unknown location to communicate with each other and to be a part of enabling navigation by the unit having the unknown location by determining time difference of arrivals of signals between the units without requiring the receiver unit to transmit signals/data to the other units.

A first aspect is directed to a navigation system for unsynchronized units. The system comprises a first anchored device having a first local ranging signal and a first internal clock, a second anchored device having a second local ranging signal and a second internal clock that is not synchronized with the first internal clock and a receiver device having a third local ranging signal and a third internal clock that is not synchronized with the first internal clock or the second internal clock, wherein when the first internal clock reaches two specified times t1 and t4, the first anchored device transmits the first local ranging signal to the second anchored device and the receiver device, when the second internal clock reaches two specified times t2 and t3, the second anchored device transmits the second local ranging signal to the first anchored device and the receiver device, and further wherein the receiver device determines a time difference of arrival between signals received from the first anchored device and the second anchored device based on the third local ranging signal and the two received first local ranging signals from the first anchored device and the two received second local ranging signals received from the second anchored device. In some embodiments, the first local ranging signal is a chirp signal. In some embodiments, the first and second anchored devices are immobile and the receiver device stores data indicating locations of the first anchored device and the second anchored device. In some embodiments, the receiver device measures receiver time shifts between the third local ranging signal and each of the two received first local ranging signals and the two received second local ranging signals. In some embodiments, the first anchored device measures first anchored device time shifts between the first local ranging signal and each of the two received second local ranging signals, and the second anchored device measures second anchored device time shifts between the second local ranging signal and each of the two received first local ranging signals. In some embodiments, the first anchored device and the second anchored device transmit the first anchored device time shifts and the second anchored device time shifts to the receiver device, and further wherein the receiver device determines the time difference of arrival between the signals received from the first anchored device and the second anchored device based on the first anchored device time shifts, the second anchored device time shifts and the receiver time shifts. In some embodiments, the time t1 is before the time t2 which is before the time t3 which is before the time t4. In some embodiments, the first internal clock, the second internal clock and the third internal clock all divide time into equal length time slots and generate the first local ranging signal, the second local ranging signal and the third local ranging signal, respectively, at each time slot. In some embodiments, the times t1, t2, t3 and t4 are each at one of the time slots and the difference between the time t1 and the time t2 is the same as the difference between the time t3 and the time t4. In some embodiments, the first anchored device transmits a timer-start packet to the second anchored device and the receiver device while starting the first local clock, the second anchored device starts the second local clock upon receiving the timer-start packet, and the receiver device starts the third local clock upon receiving the timer-start.

A second aspect is directed to a receiver device. The receiver device comprises a receiver internal clock, a receiver local signal generator for generating a receiver local ranging signal, a signal receiver for receiving signals and a processor for processing the received signals, wherein the receiver device receives a first local ranging signal with the signal receiver transmitted from a first anchored device when a first internal clock of the first anchored device reaches two specified times t1 and t4, receives a second local ranging signal with the signal receiver transmitted from a second anchored device when a second internal clock of the second anchored device reaches two specified times t2 and t3 and determines a time difference of arrival between signals received from the first anchored device and the second anchored device with the processor based on the receiver local ranging signal and the two received first local ranging signals from the first anchored device and the two received second local ranging signals received from the second anchored device. In some embodiments, the first local ranging signal is a chirp signal. In some embodiments, the first and second anchored devices are immobile, further comprising a memory storing data indicating locations of the first anchored device and the second anchored device. In some embodiments, the receiver device measures receiver time shifts between the receiver local ranging signal and each of the two received first local ranging signals and the two received second local ranging signals. In some embodiments, the first anchored device measures first anchored device time shifts between the first local ranging signal and each of the two received second local ranging signals, and the second anchored device measures second anchored device time shifts between the second local ranging signal and each of the two received first local ranging signals. In some embodiments, the receiving device receives the first anchored device time shifts and the second anchored device time shifts from the first anchored device and the second anchored device with the signal receiver, and further wherein the receiver device determines the time difference of arrival between the signals received from the first anchored device and the second anchored device based on the first anchored device time shifts, the second anchored device time shifts and the receiver time shifts. In some embodiments, the time t1 is before the time t2 which is before the time t3 which is before the time t4. In some embodiments, a first internal clock of the first anchored device, a second internal clock of the second anchored device and the receiver internal clock all divide time into equal length time slots and generate the first local ranging signal, the second local ranging signal and the receiver local ranging signal, respectively, at each time slot. In some embodiments, the times t1, t2, t3 and t4 are each at one of the time slots and the difference between the time t1 and the time t2 is the same as the difference between the time t3 and the time t4. In some embodiments, the first anchored device transmits a timer-start packet to the second anchored device and the receiver device while starting the first local clock, the second anchored device starts the second local clock upon receiving the timer-start packet, and the receiver device starts the receiver internal clock upon receiving the timer-start.

A third aspect is directed to an anchored device. The anchored device comprises a first internal clock, a first local signal generator for generating a first local ranging signal, a first signal transmitter for transmitting the first local ranging signal, a first signal receiver for receiving signals and a first processor for processing the received signals, wherein the anchored device transmits a first local ranging signal with the first signal transmitter to a receiver device and a second anchored device when the first internal clock reaches two specified times t1 and t4, receives a second local ranging signal with the first signal receiver transmitted from the second anchored device when a second internal clock of the second anchored device reaches two specified times t2 and t3, measures first anchored device time shifts between the first local ranging signal and each of the two received second local ranging signals and transmits the first anchored device time shifts to the receiver device for determining a time difference of arrival between signals received by the receiver device from the first anchored device and the second anchored device. In some embodiments, the first local ranging signal is a chirp signal. In some embodiments, the first and second anchored devices are immobile. In some embodiments, the time t1 is before the time t2 which is before the time t3 which is before the time t4. In some embodiments, the first internal clock, a second internal clock of the second anchored device and a third internal clock of the receiver device all divide time into equal length time slots and generate the first local ranging signal, the second local ranging signal and a receiver local ranging signal, respectively, at each time slot. In some embodiments, the times t1, t2, t3 and t4 are each at one of the time slots and the difference between the time t1 and the time t2 is the same as the difference between the time t3 and the time t4. In some embodiments, the first anchored device transmits a timer-start packet to the second anchored device and the receiver device while starting the first local clock, the second anchored device starts the second local clock upon receiving the timer-start packet, and the receiver device starts the third internal local clock upon receiving the timer-start.

A fourth aspect is directed to a method of navigation between unsynchronized units including a first anchored device having a first local ranging signal and a first internal clock, a second anchored device having a second local ranging signal and a second internal clock that is not synchronized with the first internal clock and a receiver device having a third local ranging signal and a third internal clock that is not synchronized with the first internal clock or the second internal clock. The method comprises transmitting the first local ranging signal from the first anchored device to the second anchored device and the receiver device when the first internal clock reaches two specified times t1 and t4, transmitting the second local ranging signal from the second anchored device to the first anchored device and the receiver device when the second internal clock reaches two specified times t2 and t3 and determining with the receiver device a time difference of arrival between signals received from the first anchored device and the second anchored device based on the third local ranging signal and the two received first local ranging signals from the first anchored device and the two received second local ranging signals received from the second anchored device. In some embodiments, the first local ranging signal is a chirp signal. In some embodiments, the first and second anchored devices are immobile and the receiver device stores data indicating locations of the first anchored device and the second anchored device. In some embodiments, the method further comprises measuring receiver time shifts between the third local ranging signal and each of the two received first local ranging signals and the two received second local ranging signals with the receiver device. In some embodiments, the method further comprises measuring first anchored device time shifts between the first local ranging signal and each of the two received second local ranging signals with the first anchored device, and measuring second anchored device time shifts between the second local ranging signal and each of the two received first local ranging signals with the second anchored device. In some embodiments, the method further comprises transmitting the first anchored device time shifts and the second anchored device time shifts to the receiver device with the first anchored device and the second anchored device and determining the time difference of arrival between the signals received from the first anchored device and the second anchored device with the receiver device based on the first anchored device time shifts, the second anchored device time shifts and the receiver time shifts. In some embodiments, the time t1 is before the time t2 which is before the time t3 which is before the time t4. In some embodiments, the first internal clock, the second internal clock and the third internal clock all divide time into equal length time slots and generate the first local ranging signal, the second local ranging signal and the third local ranging signal, respectively, at each time slot. In some embodiments, the times t1, t2, t3 and t4 are each at one of the time slots and the difference between the time t1 and the time t2 is the same as the difference between the time t3 and the time t4. In some embodiments, the method further comprises transmitting a timer-start packet to the second anchored device and the receiver device with the first anchored device while starting the first local clock with the first anchored device, starting the second local clock upon receiving the timer-start packet with the second anchored device and starting the third local clock upon receiving the timer-start with the receiver device.

BRIEF DESCRIPTION OF THE DRAWINGS

FIG. 3 illustrates a block diagram of a signal receiver according to some embodiments.

FIG. 4 illustrates a method of navigating using the system according to some embodiments.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein or with equivalent alternatives.

Embodiments of the presently claimed application are directed to a navigation system, device and method that enable unsynchronized units to communicate with each other via signals, and thereby determine a location of a mobile one of the units with respect to the other unit's locations without requiring synchronization of the units or the transmission of signals from the mobile one of the units to the other units. The navigation system, device and method is implemented with a network of one or more pairs of units whose location is known (e.g. "anchored units") and a unit whose location is unknown (e.g. "receiver unit"). The units are able to communicate via radio frequency (RF) or other types of wireless signals and determine the location of the receiver unit despite the lack of synchronization of the units. The navigation system, device and method are able to operate outdoors as well as indoors.

Figure 1:
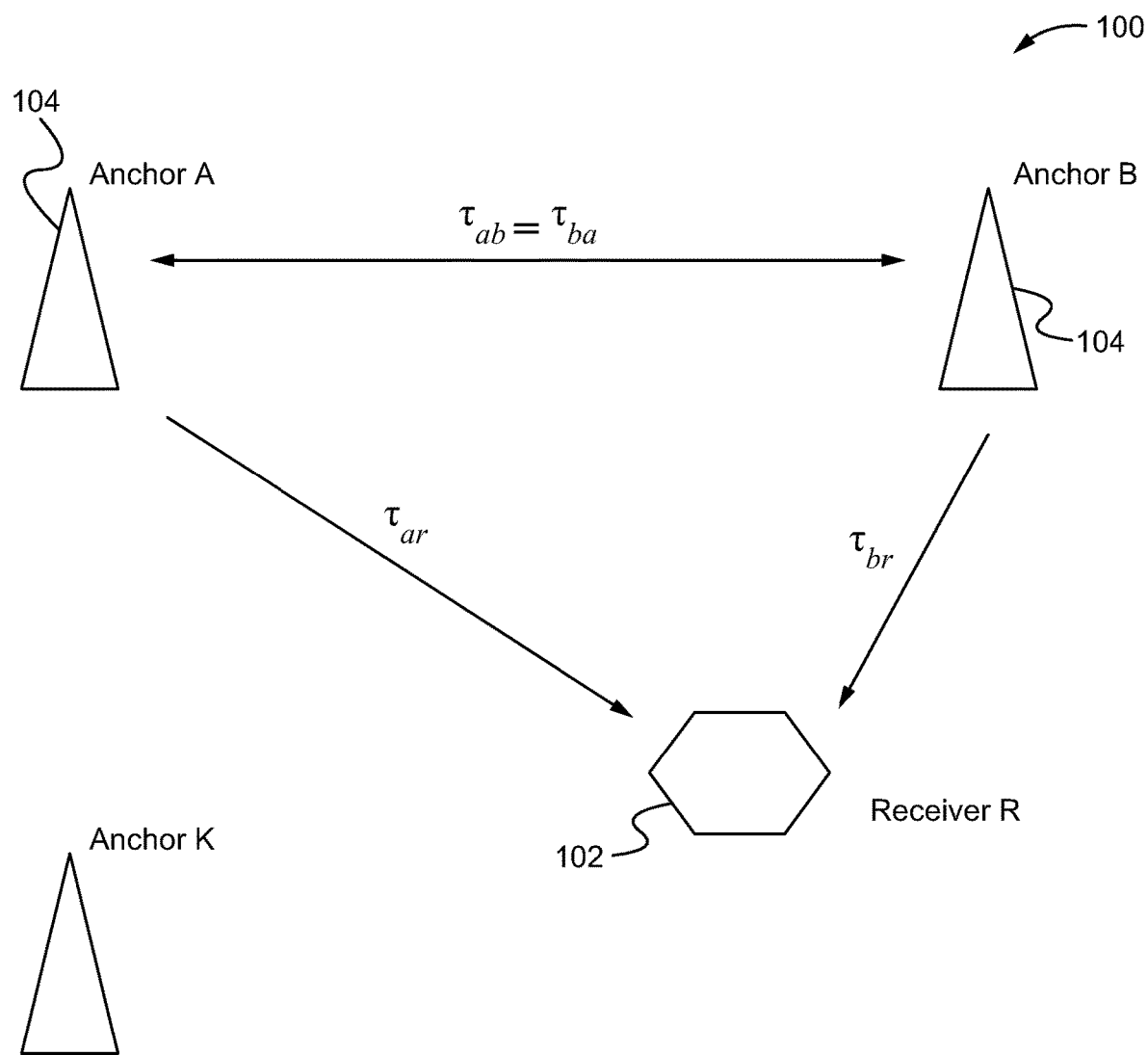
FIG. 1 illustrates a navigation system according to some embodiments.
Figure 2:
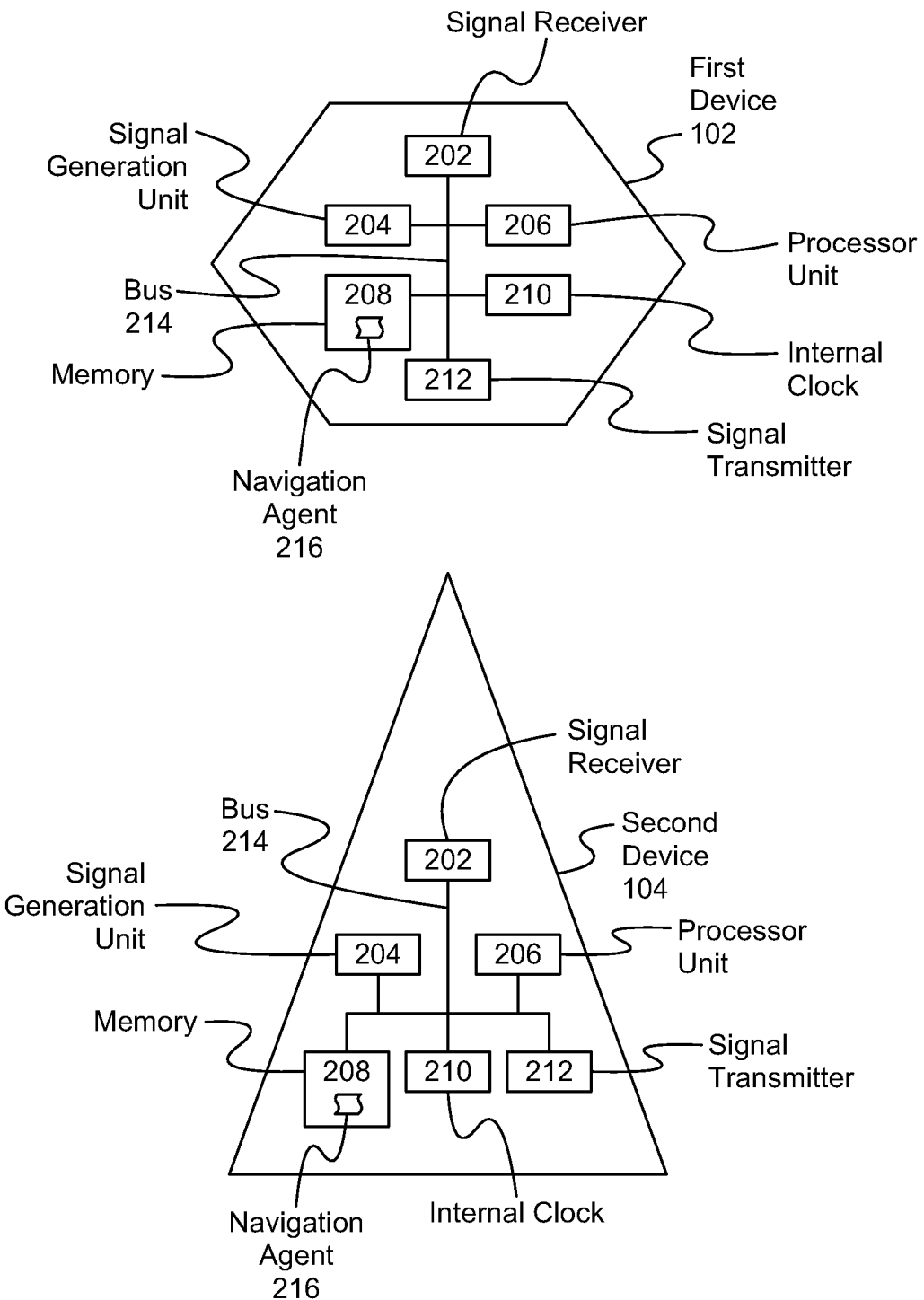
FIG. 2 illustrates a block diagram of anchored and mobile devices according to some embodiments.

FIG. 1 illustrates a navigation system 100 according to some embodiments. As shown in FIG. 1, the navigation system 100 comprises at least one first device 102 and one or more pairs of second devices 104 communicatively coupled via a wireless network. As described herein, the pairs formed by the second devices 104 are able to overlap. For example, a system of three second devices 104 A, B and K are able to form up to three pairs (AB, AK and BK) with each second device 104 being a part of two different pairs. As shown in FIG. 2, the first device 102 is able to be mobile and include a signal receiver 202 for receiving signals (e.g. from the second devices 104), a signal generation unit 204 for generating a local ranging signal (RS), a processor unit 206 for processing signals and/or stored data, a memory 208 for storing data and an internal clock 210 all coupled together via a bus 214. In some embodiments, the first devices 102 further comprise a signal transmitter 212 for transmitting signals to the second devices 104. Alternatively, the first device 102 is able to not have a signal transmitter 212 and/or be incapable of transmitting signals to the second devices 104 (although it could comprises means to transmit/communicate with other devices).

The second devices 104 are able to be immobile and like the first device 102 include a signal receiver 202 for receiving signals (e.g. from other second devices 104), a signal generation unit 204 for generating a local ranging signal (RS), a processor unit 206 for processing signals and/or stored data, a memory 208 for storing data, an internal clock 210 and a signal transmitter 212 for transmitting signals (e.g. RS) to the first device 102 and/or other second devices 104 (coupled together via a bus 214. In some embodiments, one or more of the second devices 104 are able to be permanently immobile (e.g. a cellular base station/tower) such that they are not designed to change location. Alternatively, one or more of the second devices 104 are able to be temporarily immobile such that they are designed to be able to change location, but are able to remain in the same location for the purpose of the navigation system 100. Alternatively, one or more of the second devices 104 are able to be mobile and able to determine their own location and transmit that location to the first device 102. In some embodiments, the second devices 104 are able to store in their memory 208 and/or dynamically calculate their location. In particular, their locations are able to be transmitted to the first device 102 and/or previously stored in the memory of the first device 102 such that the first device 102 is aware of the location of the second devices 104.

Additionally, although not illustrated for the sake of brevity, the first and/or second devices 102, 104 are able to comprise a display, an I/O unit and/or a network interface card (NIC). The I/O unit is able to, typically, be coupled to a keyboard, a pointing device, a hard disk, a real-time clock and/or other peripheral devices. The NIC is able to couple with a network, which is able to be the Internet, a local network, or other types of wired or wireless networks as are well known in the art. Also, one or more of the devices 102, 104 are able to include a power supply unit for receiving a power supply. Alternatively, or in addition, one or more of the devices 102, 104 are able to comprise batteries or other types of power sources. In some embodiments, one or more of the devices 102, 104 are able to comprise a graphical user interface (GUI) and/or navigation agent 216 that enables a user to command the device to determine a location of the device as described herein. In particular, the receiver/first device 102 is able to be a dedicated navigation device. Alternatively, the receiver/first device 102 is able to be a non-navigation-dedicated device, but include the navigation agent/GUI/application that improves the navigation functionality of the device 102.

In some embodiments, communications within the navigation system 100 are able to be in the radio frequency (RF). Alternatively, other frequency ranges well known in the art able to be used. In some embodiments, each device 102, 104 is able to be identified by a unique identifier. In some embodiments, the communications are able to be ensured by using, for example, half duplex, including cyclic redundancy checks (CRC) and acknowledgments (Ack) for every transferred message, however other suitable protocols are able to be used or adapted for ensuring communication as are well known in the art. Although only one pair of second devices 104 and one first device 102 are shown in FIG. 1, the system 100 is able to comprises multiple pairs and/or multiple first devices 102.

FIG. 3 illustrates a block diagram of the signal receiver 202 according to some embodiments. As shown in FIG. 3, the receiver 202 comprises an input node 305 for inputting signals detected by an antenna, a filter element 304, one or more signal mixers 301, 302, a summing element 303 and an output node 306. Specifically, the input node 305 is coupled to the input of one of the mixers 301 directly and to the input of the other mixer 302 via the filter 304. The mixers 301, 302 each have inputs coupled to the signal generator 204 for receiving locally generated signals and an output coupled to the summing element 303, which is coupled to the output node 306. In some embodiments, the receiver 202 is a SSB down converting receiver.

Each device 102, 104 is able to divide the time into equal length time slots and at each time slot, the signal generator 204 of the device 102, 104 is able to generate a local Ranging Signal (RS) (e.g. a repetitive chirp signal). The RS is a signal that enables the devices 102, 104 to measure the time shift between the incoming signal and the local generated RS. Thus, within each device 102, 104 at each time slot, the local ranging signal is generated by the signal generator 204 of the devices 102, 104. As described herein, each time slot starts at local times ti where i=1, 2, 3, 4 and so on. The internal clocks 210 of the devices 102, 104 are not accurately synchronized with each other and/or with an "imaginary" global reference clock (e.g. the internal clocks 210 are each able to be shifted differently relative to the reference clock). As described herein, the synchronization error of a device k will be denoted $T_k$ where $T_k$ is a time shift relative to the reference clock. Additionally, the frequency of the internal clocks 210 of each of the devices 102, 104 is also able to be unequal due to frequency inaccuracy. Specifically, the clocks 210 are assumed to be linearly drifting. Thus, as described herein $P_k$ will be the inaccuracy of the clock 210 of device k. If for instance the frequency of device k's clock deviates by 1 part per million (ppm) relative to a perfect clock, then its $P_k=1+1e^{-6}$.

As a result, of these clock and synchronization errors, a transmission or signal generation (e.g. local ranging signal) programed to start at device k, at local time $t_{kl}$, will start at reference clock time $T_k+t_{kl} \times P_k$. Correspondingly, a signal leaving a device k at time t will arrive at device j at time $t+\tau_{kj}$ where $\tau_{kj}$ is the trip delay between device k and device j. In particular, this trip delay value is the distance between devices k and j divided by the propagation speed of the transmitted signal (e.g. propagation speed=C=299792458 m/s for radio based communication).

Figure 5:
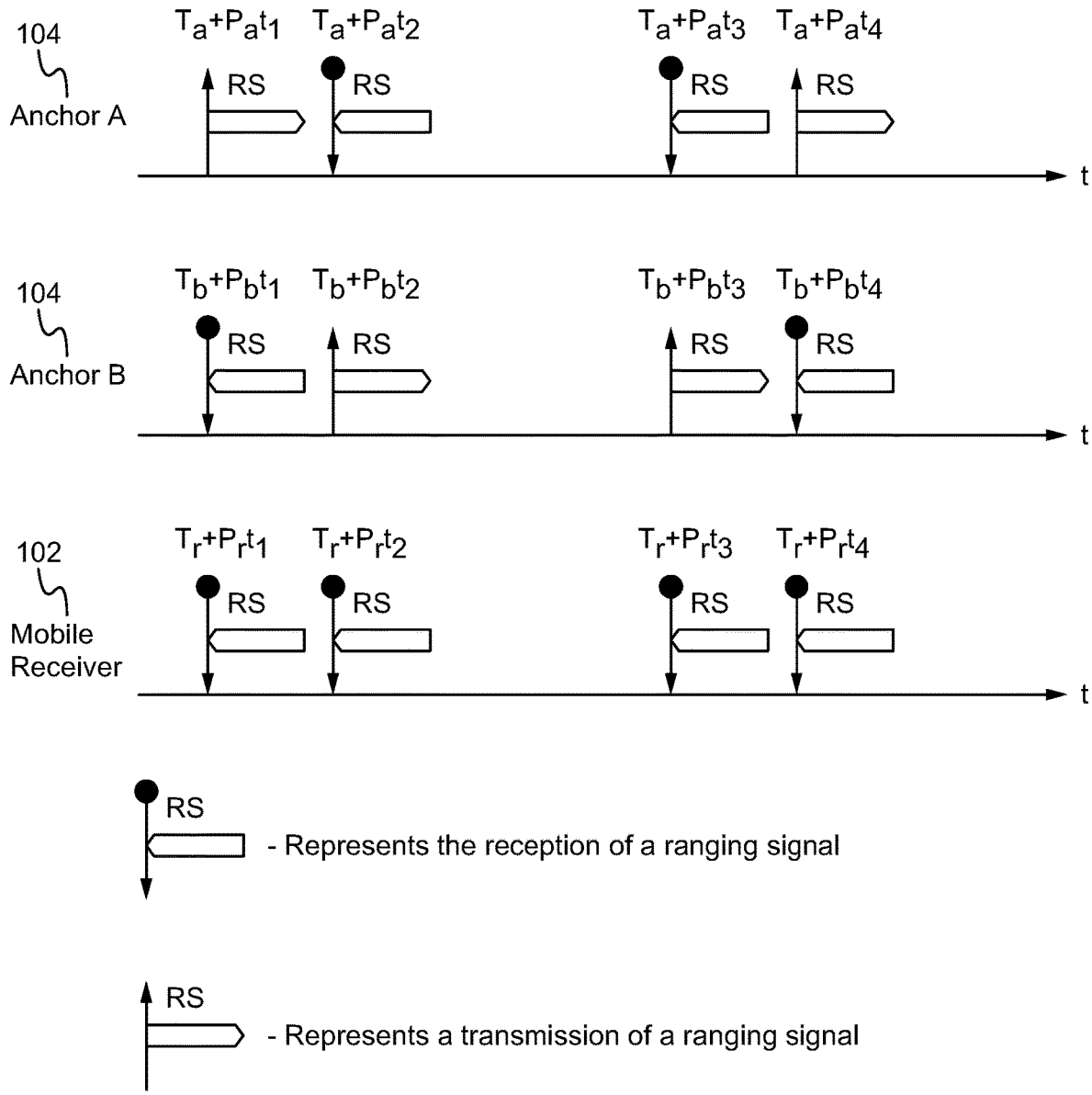
FIG. 5 illustrates a signal timing scheme of the system according to some embodiments.

In operation, in some embodiments, a data packet that is transmitted from one of the second devices 104 to the other second devices 104 and the first device 102. Each device 102, 104 is then able to start/reset their internal clock 210 when receiving (or sending) this data packet. Alternatively, the transmission of the data packet is able to be omitted. As shown in FIG. 5, at each time slot, a single one of the second devices 104 transmits its local ranging signal while all other devices 102, 104 receive the signal. For example, one of the second devices 104 transmits its ranging signal to the other devices 102, 104 at a first time slot (e.g. t1), then a different one of the second devices 104 transmits its ranging signal to the other devices 102, 104, and so on until all of the second devices 104 have transmitted their ranging signal twice. Concurrently, for each time slot, all of the devices 102, 104 not transmitting that slot, still locally generate their local ranging signal as well as receiving the transmitted ranging signal from the one transmitting second device 104 of that time slot. In particular, each time slot, each of the non-transmitting of the devices 102, 104 is able to measure a time shift between the received ranging signal and their locally generated ranging signal. These measured time shifts are then able to be transmitted to the first device 102 which is able to determine the (compensated for un-synchronization) time difference of arrival between pairs of the second devices 104, and in the case of at least two pairs of second devices 104, is able to determine its location relative to the second devices based on its measured time shifts and the received measured time shifts 104 despite the devices 102, 104 lack of synchronization. In particular, it is noted that while determination by the first device 102 of the time difference of arrival between unsynchronized second units 104 only requires a single pair of second units 104, for determination of the location of the receiver using multilateration, at least two pairs of second devices 104 are required.

Specifically, in the case where there are two second devices 104 and one first device 102 as shown in FIG. 1, each of the second devices 104 will receive two ranging signals (i.e. two from each other second device 104) and thus determine two time shifts each based on the equations 1-4 below:

$$M_{b1}=T_a+P_a \times t_1+\tau_{ab}-T_b-P_b \times t_1 \qquad \text{Equation 1}$$

$$M_{a2}=T_b+P_b \times t_2+\tau_{ba}-T_a-P_a \times t_2 \qquad \text{Equation 2}$$

$$M_{a3}=T_b+P_b \times t_3+\tau_{ba}-T_a-P_a \times t_3 \qquad \text{Equation 3}$$

$$M_{b4}=T_a+P_a \times t_4+\tau_{ab}-T_b-P_b \times t_4 \qquad \text{Equation 4}$$

where M is the value of the time shift measured at the indicated device/time (e.g. $M_{b1}$ refers to the time shift measured by the second device B at time slot t1); T is the synchronization error at the indicated device (e.g. $T_a$ is the synchronization error at second device A); P is the inaccuracy of the clock 210 of device (e.g. $P_a$ is the inaccuracy of the clock 210 of second device A); t is the time slot; and $\tau_{kj}$ is the trip delay between the transmitting and receiving devices (e.g. $\tau_{ab}$ is the trip delay between second device a and second device b).

Similarly, the first device 102 will receive four ranging signals (i.e. two from each of the second devices 104) and thus determine four time shifts based on the equations 5-8 below:

$$M_{r1}=T_a+P_a \times t_1+\tau_{ar}-T_r-P_r \times t_1 \qquad \text{Equation 5}$$

$$M_{r2}=T_b+P_b \times t_2+\tau_{br}-T_r-P_r \times t_2 \qquad \text{Equation 6}$$

$$M_{r3}=T_b+P_b \times t_3+\tau_{br}-T_r-P_r \times t_3 \qquad \text{Equation 7}$$

$$M_{r4}=T_a+P_a \times t_4+\tau_{ar}-T_r-P_r \times t_4 \qquad \text{Equation 8}$$

Then, as described above, the time shift measurements of the second devices (e.g. $M_{b1}$, $M_{a2}$, etc.) are able to be transmitted to the first device 102.

The processor 206 of the first device 102 is then able to use the time shifts (i.e. in this case 8 time shift measurements) to determine a compensated for un-synchronization time difference of arrival between signal received from the second devices 104, which in the case of multiple pairs of second devices 104 then enables the first device 102 to use multilateration to determine its location despite the lack of synchronization between the devices. Specifically, the processor 206 is able to subtract equation 2 from equation 1 and since $\tau_{ab}$ is equal to $\tau_{ba}$ the result is:

$$M_{b1}-M_{a2}=2 \times (T_a-T_b)+(P_a-P_b) \times (t_1+t_2) \qquad \text{Equation 9}$$

In the same manner, by subtracting equation 3 from equation 4 the result is:

$$M_{a2}-M_{b4}=-2 \times (T_a-T_b)-(P_a-P_b) \times (t_2+t_4) \qquad \text{Equation 10}$$

and subtracting equation 10 from equation 9 results in:

$$M_{b1}+M_{b4}-M_{a2}-M_{a3}=4 \times (T_a-T_b)+(P_a-P_b) \times (t_1+t_2+t_3+t_4) \qquad \text{Equation 11}$$

Now, it can be observed from the time slots that $t_2-t_1=t_4-t_3$ which can be said to be equal to H (i.e. $H=t_2-t_1=t_4-t_3$). Therefore, it can be determined that $t_1+t_2+t_3+t_4$, found in equation 11, is equal to $t_1+t_1+H+t_3+t_3+H$. If $\Gamma$ is then assigned as being equal to $t_1+T+t_3$, then $t_1+t_2+t_3+t_4$ is equal to $2 \times \Gamma$. Using this, equation 11 can be rewritten as follows:

$$M_{b1}+M_{b4}-M_{a2}-M_{a3}=4 \times (T_a-T_b)+2 \times (P_a-P_b) \times \Gamma \qquad \text{Equation 12}$$

Now, returning to the time shift measurements, subtracting equation 6 from equation 5 results in:

$$M_{r1} - M_{r2} = (T_a - T_b) + P_a \times t_1 - P_b \times t_2 - P_r \times (t_1 - t_2) + \tau_{ar} - \tau_{br} \quad \text{Equation 13}$$

and subtracting equation 7 from equation 8 results in:

$$M_{r4} - M_{r3} = (T_a - T_b) + P_a \times t_4 - P_b \times t_3 - P_r \times (t_4 - t_3) + \tau_{ar} - \tau_{br} \quad \text{Equation 14}$$

Then by adding equation 14 and 15 (and since $t_2 - t_1 = t_4 - t_3$ as described above) the resulting equation is:

$$M_{r1} - M_{r2} + M_{r4} - M_{r3} = 2 \times (T_a - T_b) + P_a \times (t_1 + t_4) - P_b \times (t_2 + t_3) + 2 \times (\tau_{ar} - \tau_{br}) \quad \text{Equation 15}$$

Recalling that $H = t_2 - t_1 = t_4 - t_3$, it follows that $t_2 = t_1 + H$; and $t_4 = t_3 + H$. Therefore, $t_1 + t_4 = t_1 + t_3 + H$, which above we defined as being $\Gamma$. In the same way, $t_2 + t_3 = t_1 + H + t_3 = \Gamma$. With this in mind, equation 15 can be rewritten as:

$$M_{r1} - M_{r2} + M_{r4} - M_{r3} = 2 \times (T_a - T_b) + \Gamma \times (P_a - P_b) + 2 \times (\tau_{ar} - \tau_{br}) \quad \text{Equation 16}$$

Dividing equation 12 by equation 2 and inserting into equation 16 then results in:

$$M_{r1} - M_{r2} + M_{r4} - M_{r3} = \frac{1}{2}(M_{b1} + M_{b4} - M_{a2} - M_{a3}) + 2 \times (\tau_{ar} - \tau_{br}) \quad \text{Equation 17}$$

Finally, rearranging equation 17 results in:

$$\tau_{ar} - \tau_{br} = \frac{1}{2}(M_{r1} - M_{r2} + M_{r4} - M_{r3}) - \frac{1}{4}(M_{b1} + M_{b4} - M_{a2} - M_{a3}) \quad \text{Equation 18}$$

where $\tau_{ar} - \tau_{br}$ is the (compensated for un-synchronization) time difference of arrival of the signals from any two/pair of second devices 104 which can be applied to those signals to cancel out de-synchronization of the signals and (in the case of two or more pairs) enable the location of the first device 102 to be determined via multilateration (as if the devices 102, 104 were synchronized). Although, this process has been described herein with respect to a single pair of second devices 104 and one first device 102, it is noted that it is able to be performed concurrently or simultaneously for multiple pairs of second devices 104 with the transmissions/calculations occurring for each pair. In particular, in the same manner as described above, each second device 104 transmits (at least) twice to the first device 102 along with any other device 104 that it is paired with (e.g. a single second device 104 can be paired with multiple other second devices 104). For example, if the maximum amount of pairs is desired, then each second device 104 would transmit/broadcast (at least) twice to every other second device 104 in addition to the first device 102. Correspondingly, the time shifts are calculated at the second devices 104 for each pair that the second device 104 is a part of, and the receiver receives all of the measured time shifts from the second devices 104 and determines the compensated for un-synchronization time difference of arrival for each of the pairs 104 based on the time shifts associated with those pairs 104. Thus, the system 100, when applied to three or more second devices 104, provides the advantage of enabling a first/receiver device 102 to determine its position using multilateration despite a lack of synchronization with the other devices 104 by determining the compensated for un-synchronization time difference of arrival between the other pairs of devices 104 as described above.

It should be noted that the pairs are able to share devices 104 and/or not share devices 104. For example, for anchors A, B and C with two pairs being desired, the pairs are able to be any two of pair AB, AC or BC (such that at least one device 104 is shared by the two selected pairs). Alternatively or in combination, one or more of the pairs are able to be formed by second devices 104 that are not shared (e.g. for anchors A, B, C and D and two pairs being desired, the pairs are able to be pair AB and CD where no device is shared by more than one pair). It should also be noted that although as described herein each second device 104 transmits twice, any even number of transmissions per second device 104 is able to be used to cancel out the clock drift and/or synchronization error. Further, in some embodiments the transmission order is able to be symmetrical (e.g. for two second devices A and B the transmission order is A, B, B, A). This can be further expanded to more than second devices 104. The order of transmission is able to be such that for a pair of second devices K, L, the time slots should be ordered such that if K transmission lags L transmission by a certain time slot (TS) distance for the first transmission then at second transmission, L will lag K by the same TS distance.

If for instance there are 5 second devices: A, B, C, D, and E, then the order of transmissions can be as shown in Table 1:

TABLE 1

| Order of Time Slots for 5 Anchors | | | | | | | | | | |
|---|---|---|---|---|---|---|---|---|---|---|
| TS# | 1 | 2 | 3 | 4 | 5 | 6 | 7 | 8 | 9 | 10 |
| | First Transmission | | | | | Second Transmission | | | | |
| Transmitting device | A | B | C | D | E | E | D | C | B | A |

Using this transmission scheme enables the first device 102 to determine the compensated for un-synchronization time difference of arrival and thus adjust for the clock drift and/or synchronization error of any of the pairs of the second devices 104.

In some embodiments, before, after or concurrently with the above steps, the locations of the second devices 104 are able to be transmitted to the first device 102 either from the second devices 104 and/or from another source. Alternatively, the locations of the second devices 104 are able to be pre-programmed/stored in the first device 102 and/or omitted. In any case, upon determination of the location of the second devices 104 (for at least two pairs of second devices 104), the first device 102 is able to determine its "absolute" location, not just the location relative to the second devices 104. As a result, the system 100 provides the benefit of overcoming the lack of synchronization of the devices as well as inherent clock drift/error that cannot be overcome via synchronization.

This system 100 also provides the benefit of overcoming errors caused by movement of the first device 102 during the transmission process. Specifically, previously, in systems where the second devices 104 are not transmitting at the same time, the movement of the first device 102 might produce an error. The reason for that is the fact that the range from the first device 102 to the second device(s) 104 is changing. As an example, if the compensated for un-synchronization time difference of arrival between the first transmitting device 104 to the last one 104 is to be measured, then ranging to the first transmitting second device 104 is performed when the first device 102 is positioned at a certain position while ranging to the last transmitting second device 104 is performed when the mobile receiver is positioned elsewhere (causing the ranging error). However, the transmission scheme of the present system 100 overcomes this issue by canceling the motion effect of the first device 102. Specifically, assume second device A transmits at transmission times $t_1$ and $t_4$. The position of the first device 102 at time $t_1$ can be denoted as $x_{t1}$, and the position of the first device 102 at time $t_4$ can be denoted as $x_{t4}$. If the first device 102 moves at a constant speed v, then:

$$\vec{x}_{t2} = \vec{x}_{t1} + \vec{v} \times (t_4 - t_1)$$  Equation 19

Now if we average $x_{t2}$ and $x_{t1}$, it results in:

$$\frac{\vec{x}_{t1} + \vec{x}_{t2}}{2} = \vec{x}_{t1} + \vec{v} \times (t_4 - t_1)/2$$  Equation 20 which is equivalent to a position right at the middle between the positions at $t_1$ and $t_4$. Examining Equation 18, it can be easily seen that the process described above involves the same average at Equation 20:

$$\frac{1}{2}(M_{r1} + M_{r4}).$$

Thus, with symmetric transmission order as described in Table 1, all sequential measurements are equivalent to measurements that are done right when the first device 102 is at the center position of its movement from the first measurement to the last one as if the first device 102 were not moving. As a result, the system 100 also provides the advantage of overcoming movement error caused by a moving first device 102.

FIG. 4 illustrates a method of navigation using the system 100 according to some embodiments. As shown in FIG. 4, a first anchored device 104 transmits a first local ranging signal to the a second anchored device 104 and a receiver device 102 when its internal clock reaches two specified times at the step 404. The second anchored device 104 transmits a second local ranging signal to the first anchored device 104 and the receiver device 102 when its clock reaches two specified times at the step 404. The receiver device 102 and the anchored devices 104 each determine time shifts between their local ranging signal and each of the received local ranging signals at the step 406. The anchored devices 104 transmit their measured time shifts to the receiver device 102 at the step 408. The receiver device 102 determines a (compensated for un-synchronization) time difference of arrival between signals received from the first anchored device 104 and the second anchored device 104 based on its measured time shifts and the time shifts received from the anchored devices 104 at the step 410. As a result, the method provides the advantage of enabling a receiver 102 and pairs of anchors 104 to overcome a lack of synchronization based on calculating a compensated for un-synchronization time difference of arrival between the signals from the pairs of anchors 104, and when applied to a plurality of pairs of anchors 104, the ability of compensate for the de-synchronization enables the use of multilateration by the receiver in order to determine the receiver's location. In some embodiments, the method further comprises transmitting a timer-start packet from one of the anchored devices 104 to the receiver device 102 and the other anchored devices 104 and starting the local clocks upon the transmission and/or reception of the timer-start packet.

Thus, the navigation system, method and device described herein has numerous advantages. In particular, when using multilateration for navigation, it enables overcoming the lack of synchronization of the devices as well as inherent clock drift/error. Further, it automatically compensates for receiver device movement during navigation due to the anchored device communication sequencing. Accordingly, the system method and device improves the receiver and/or anchor devices themselves by enabling them to provide accurate navigation without the need for synchronization or the minimization of clock drift.

The present application has been described in terms of specific embodiments incorporating details to facilitate the understanding of principles of construction and operation of the invention. For example, the amount of implementation using hardware and software is able to be changed, without departing from the spirit of the inventions. Further, such reference herein to specific embodiments and details thereof is not intended to limit the scope of the claims appended hereto. A person skilled in the art would appreciate that various modifications and revisions to system and method for locating items and places. Consequently, the claims should be broadly construed, consistent with the spirit and scope of the invention, and should not be limited to their exact, literal meaning

What is claimed is:

1. A system for determining a time difference of arrival of signals between unsynchronized devices, the system comprising:
   a first anchored device having a first signal mixer, a first signal generator generating a first local ranging signal and a first internal clock that divides time into equal length time slots;
   a second anchored device having a second signal mixer, a second signal generator generating a second local ranging signal and a second internal clock that is not synchronized with the first internal clock and divides time into the equal length time slots; and
   a receiver device having a receiver signal mixer, a receiver signal generator generating a third local ranging signal and a third internal clock that is not synchronized with the first internal clock or the second internal clock and divides time into the equal length time slots,
   wherein when the first internal clock reaches time t1, the first anchored device transmits a t1 first local ranging signal generated at the time t1 of the first internal clock to the second anchored device and the receiver device, when the first internal clock reaches time t4, the first anchored device transmits a t4 first local ranging signal generated at the time t4 of the first internal clock to the second anchored device and the receiver device, when the second internal clock reaches time t2, the second anchored device transmits a t2 second local ranging signal generated at the time t2 of the second internal clock to the first anchored device and the receiver device, and when the second internal clock reaches time t3, the second anchored device transmits a t3 second local ranging signal generated at the time t3 of the second internal clock to the first anchored device and the receiver device,
   wherein with the receiver signal mixer the receiver device measures:
      a first receiver time shift between a t1 third local ranging signal generated at the time t1 of the third internal clock and the t1 first local ranging signal as received by the receiver device,
a second receiver time shift between a t2 third local ranging signal generated at the time t2 of the third internal clock and the t2 second local ranging signal as received by the receiver device,
a third receiver time shift between a t3 third local ranging signal generated at the time t3 of the third internal clock and the t3 second local ranging signal as received by the receiver device, and
a fourth receiver time shift between a t4 third local ranging signal generated at the time t4 of the third internal clock and the t4 first local ranging signal as received by the receiver device,
wherein with the first signal mixer the first anchored device measures:
an initial first anchored device time shift between a t2 first local ranging signal generated at time t2 of the first internal clock and the t2 second local ranging signal as received by the first anchored device, and
a subsequent first anchored device time shift between a t3 first local ranging signal generated at time t3 of the first internal clock and the t3 second local ranging signal as received by the first anchored device,
wherein with the second signal mixer the second anchored device measures:
an initial second anchored device time shift between a t1 second local ranging signal generated at the time t1 of the second internal clock and the t1 first local ranging signal as received by the second anchored device, and
a subsequent second anchored device time shift between a t4 second local ranging signal generated at the time t4 of the second internal clock and the t4 first local ranging signal as received by the second anchored device,
wherein the first anchored device and the second anchored device transmit the initial and subsequent first anchored device time shifts and the initial and subsequent second anchored device time shifts to the receiver device,
wherein the receiver device determines a time difference of arrival between signals received from the first anchored device and the second anchored device based on the initial and subsequent first anchored device time shifts, the initial and subsequent second anchored device time shifts and the first, second third and fourth receiver time shifts.

2. The system of claim 1, wherein the first local ranging signal is a chirp signal.

3. The system of claim 2, wherein the first and second anchored devices are immobile and the receiver device stores data indicating locations of the first anchored device and the second anchored device.

4. The system of claim 3, further comprising a third anchored device having a fourth local ranging signal and a fourth internal clock that is not synchronized with either of the first internal clock and the second internal clock, wherein when the second internal clock reaches the two specified times t2 and t3, the second anchored device also transmits the second local ranging signal to the third anchored device, and when the fourth internal clock reaches two specified times t1.5 and t3.5, the third anchored device transmits the fourth local ranging signal to the second anchored device and the receiver device, and further wherein the receiver device determines a time difference of arrival between signals received from the third anchored device and the second anchored device based on the third local ranging signal and the two received fourth local ranging signals from the third anchored device and the two received second local ranging signals received from the second anchored device.

5. The system of claim 4, wherein the third anchored device measures third anchored device time shifts between the fourth local ranging signal and each of the two received second local ranging signals, and the second anchored device measures additional second anchored device time shifts between the second local ranging signal and each of the two received fourth local ranging signals.

6. The system of claim 5, wherein the third anchored device and the second anchored device transmit the third anchored device time shifts and the additional second anchored device time shifts to the receiver device, and further wherein the receiver device determines the time difference of arrival between the signals received from the third anchored device and the second anchored device based on the third anchored device time shifts, the additional second anchored device time shifts and the receiver time shifts.

7. The system of claim 6, wherein the receiver device determines its location based on the time difference of arrival between the first anchored device and the second anchored device and the time difference of arrival between the second anchored device and the third anchored device using multilateration.

8. The system of claim 7, wherein the time t1 is before the time t2 which is before the time t3 which is before the time t4.

9. The system of claim 8, wherein the first internal clock, the second internal clock and the third internal clock all generate the first local ranging signal, the second local ranging signal and the third local ranging signal, respectively, at each time slot.

10. The system of claim 9, wherein the times t1, t2, t3 and t4 are each at one of the time slots and the difference between the time t1 and the time t2 is the same as the difference between the time t3 and the time t4.

11. The system of claim 10, wherein the first anchored device transmits a timer-start packet to the second anchored device and the receiver device while starting the first local clock, the second anchored device starts the second local clock upon receiving the timer-start packet, and the receiver device starts the third local clock upon receiving the timer-start.

12. A receiver device comprising:
a receiver internal clock that divides time into equal length time slots;
a receiver local signal generator for generating a receiver local ranging signal;
a signal receiver including a signal mixer for receiving signals; and
a processor for processing the received signals and a memory storing code, wherein when executed by the processor the code causes the receiver device to:
receive a t1 first local ranging signal with the signal receiver, the t1 first local ranging signal transmitted from a first anchored device when a first internal clock of the first anchored device reaches a time t1;
receive a t4 first local ranging signal with the signal receiver, the t4 first local ranging signal transmitted from the first anchored device when the first internal clock of the first anchored device reaches a time t4;
receive a t2 second local ranging signal with the signal receiver, the t2 second local ranging signal transmitted from a second anchored device when a second internal clock of the second anchored device reaches a time t2;

receive a t3 second local ranging signal with the signal receiver, the t3 second local ranging signal transmitted from the second anchored device when the second internal clock of the second anchored device reaches a time t3;

measure with the signal mixer:
- a first receiver time shift between the receiver local ranging signal generated at time t1 of the receiver internal clock and the received t1 first local ranging signal transmitted at the time t1,
- a second receiver time shift between the receiver local ranging signal generated at the time t2 of the receiver internal clock and the received t2 second local ranging signal transmitted at the time t2,
- a third receiver time shift between the receiver local ranging signal generated at the time t3 of the receiver internal clock and the received t3 second local ranging signal transmitted at the time t3, and
- a fourth receiver time shift between the receiver local ranging signal generated at the time t4 of the receiver internal clock and the received t4 first local ranging signal transmitted at the time t4;

receive an initial first anchored device time shift, a subsequent first anchored device time shift, an initial second anchored device time shift and a subsequent second anchored device time shift from the first anchored device and the second anchored device with the signal receiver, wherein the initial first anchored device time shift is the shift in time between a t2 first local ranging signal of the first anchored device generated at the time t2 and the t2 second local ranging signal as received by the first anchored device, the subsequent first anchored device time shift is the shift in time between a t3 first local ranging signal of the first anchored device generated at the time t3 and the t3 second local ranging signal as received by the first anchored device, the initial second anchored device time shift is the shift in time between a t1 second local ranging signal of the second anchored device generated at the time t1 and the t1 first local ranging signal as received by the second anchored device, and the subsequent second anchored device time shift is the shift in time between a t4 second local ranging signal of the second anchored device generated at the time t4 and the t4 first local ranging signal as received by the second anchored device; and determine a time difference of arrival between signals received from the first anchored device and the second anchored device based on the initial and subsequent first anchored device time shifts, the initial and subsequent second anchored device time shifts and the first, second third and fourth receiver time shifts.

13. The receiver device of claim 12, wherein the receiver local ranging signal is a chirp signal.

14. The receiver device of claim 13, wherein the first and second anchored devices are immobile, further comprising a memory storing data indicating locations of the first anchored device and the second anchored device.

15. The receiver device of claim 14, wherein when executed by the processor the code causes the receiver device to:

receive a third local ranging signal with the signal receiver transmitted from a third anchored device when a third internal clock of the third anchored device reaches two specified times t1.5 and t3.5; and determine a time difference of arrival between signals received from the third anchored device and the second anchored device with the processor based on the receiver local ranging signal and the two received third local ranging signals from the third anchored device and the two received second local ranging signals received from the second anchored device.

16. The receiver device of claim 15, wherein the receiver device measures receiver time shifts between the receiver local ranging signal and the two received third local ranging signals.

17. The receiver device of claim 16, wherein when executed by the processor the code causes the receiving device to receive the third anchored device time shifts and the additional second anchored device time shifts from the third anchored device and the second anchored device with the signal receiver, wherein the third anchored device time shifts are time shifts between the third local ranging signal and each of the two received second local ranging signals, and the additional second anchored device time shifts are time shifts between the second local ranging signal and each of the two received third local ranging signals, and further wherein when executed by the processor the code causes the receiver device to determine the time difference of arrival between the signals received from the third anchored device and the second anchored device based on the third anchored device time shifts, the additional second anchored device time shifts and the receiver time shifts.

18. The receiver device of claim 17, wherein when executed by the processor the code causes the receiver device to determine a location of the receiver device based on the time difference of arrival between the first anchored device and the second anchored device and the time difference of arrival between the second anchored device and the third anchored device using multilateration.

19. The receiver device of claim 18, wherein the time t1 is before the time t2 which is before the time t3 which is before the time t4.

20. The receiver device of claim 19, wherein a first internal clock of the first anchored device, a second internal clock of the second anchored device and the receiver internal clock all divide time into the equal length time slots and generate the first local ranging signal, the second local ranging signal and the receiver local ranging signal, respectively, at each time slot.

21. The receiver device of claim 20, wherein the times t1, t2, t3 and t4 are each at one of the time slots and the difference between the time t1 and the time t2 is the same as the difference between the time t3 and the time t4.

22. The receiver device of claim 21, wherein the first anchored device transmits a timer-start packet to the second anchored device and the receiver device while starting the first local clock, the second anchored device starts the second local clock upon receiving the timer-start packet, and the receiver device starts the receiver internal clock upon receiving the timer-start.

23. An anchored device comprising:
a first internal clock that divides time into equal length time slots;
a first local signal generator for generating a first local ranging signal;
a first signal transmitter for transmitting the first local ranging signal;

a first signal receiver including a signal mixer for receiving signals; and a first processor for processing the received signals and a memory storing code, wherein when executed by the processor the code causes the anchored device to:

transmit a t1 first local ranging signal generated at time t1 of the first internal clock with the first signal transmitter to a receiver device and a second anchored device when the first internal clock reaches the time t1;

transmit a t4 first local ranging signal generated at time t4 of the first internal clock with the first signal transmitter to the receiver device and the second anchored device when the first internal clock reaches the time t4;

receive a t2 second local ranging signal with the first signal receiver, the t2 second local ranging signal transmitted from the second anchored device when a second internal clock of the second anchored device reaches time t2;

receive a t3 second local ranging signal with the first signal receiver, the t3 second local ranging signal transmitted from the second anchored device when the second internal clock of the second anchored device reaches time t3;

measure with the signal mixer:

an initial first anchored device time shift between a t2 first local ranging signal generated at the time t2 of the first internal clock and the t2 second local ranging signal, and a subsequent first anchored device time shift between a t3 first local ranging signal generated at the time t3 of the first internal clock and the t3 second local ranging signal; and transmit the initial and subsequent first anchored device time shifts to the receiver device for determining a time difference of arrival between signals received by the receiver device from the first anchored device and the second anchored device.

24. The anchored device of claim 23, wherein the first local ranging signal is a chirp signal.

25. The anchored device of claim 24, wherein the first and second anchored devices are immobile.

26. The anchored device of claim 25, wherein when executed by the processor the code causes the anchored device to:

receive a third local ranging signal with the first signal receiver transmitted from a third anchored device when a third internal clock of the third anchored device reaches two specified times t1.5 and t3.5;

measure additional first anchored device time shifts between the first local ranging signal and each of the two received third local ranging signals; and transmit the additional first anchored device time shifts to the receiver device for determining a time difference of arrival between signals received by the receiver device from the anchored device and the third anchored device.

27. The anchored device of claim 26, wherein the time t1 is before the time t2 which is before the time t3 which is before the time t4.

28. The anchored device of claim 27, wherein the first internal clock, a second internal clock of the second anchored device and a third internal clock of the receiver device all divide time into the equal length time slots and generate the first local ranging signal, the second local ranging signal and a receiver local ranging signal, respectively, at each time slot.

29. The anchored device of claim 28, wherein the times t1, t2, t3 and t4 are each at one of the time slots and the difference between the time t1 and the time t2 is the same as the difference between the time t3 and the time t4.

30. The anchored device of claim 29, wherein the first anchored device transmits a timer-start packet to the second anchored device and the receiver device while starting the first local clock, the second anchored device starts the second local clock upon receiving the timer-start packet, and the receiver device starts the third internal local clock upon receiving the timer-start.

31. A method of determining a time difference of arrival of signals between unsynchronized units including a first anchored device having a first signal mixer, a first signal generator generating a first local ranging signal and a first internal clock that divides time into equal length time slots, a second anchored device having a second signal mixer, a second signal generator generating a second local ranging signal and a second internal clock that is not synchronized with the first internal clock and divides time into the equal length time slots, and a receiver device having a receiver signal mixer, a receiver signal generator generating a third local ranging signal and a third internal clock that is not synchronized with the first internal clock or the second internal clock and divides time into the equal length time slots, the method comprising:

transmitting a t1 first local ranging signal generated at time t1 of the first internal clock from the first anchored device to the second anchored device and the receiver device when the first internal clock reaches the time t1;

transmitting a t4 first local ranging signal generated at time t4 of the first internal clock from the first anchored device to the second anchored device and the receiver device when the first internal clock reaches the time t4;

transmitting a t2 second local ranging signal generated at time t2 of the second internal clock from the second anchored device to the first anchored device and the receiver device when the second internal clock reaches the time t2;

transmitting a t3 second local ranging signal generated at time t3 of the second internal clock from the second anchored device to the first anchored device and the receiver device when the second internal clock reaches the time t3;

measuring with the receiver signal mixer:

a first receiver time shift between a t1 third local ranging signal generated at the time t1 of the third internal clock and the t1 first local ranging signal as received by the receiver device, a second receiver time shift between a t2 third local ranging signal generated at the time t2 of the third internal clock and the t2 second local ranging signal as received by the receiver device, a third receiver time shift between a t3 third local ranging signal generated at the time t3 of the third internal clock and the t3 second local ranging signal as received by the receiver device, and a fourth receiver time shift between a t4 third local ranging signal generated at the time t4 of the third internal clock and the t4 first local ranging signal as received by the receiver device;

measuring with the first signal mixer:
- an initial first anchored device time shift between a t2 first local ranging signal generated at the time t2 of the first internal clock and the t2 second local ranging signal, and
- a subsequent first anchored device time shift between a t3 first local ranging signal generated at the time t3 of the first internal clock and the t3 second local ranging signal;

measuring with the second signal mixer:
- an initial second anchored device time shift between a t1 second local ranging signal generated at the time t1 and the t1 first local ranging signal, and
- a subsequent second anchored device time shift between a t4 second local ranging signal generated at the time t4 and the t4 first local ranging signal;

transmitting the initial and subsequent first anchored device time shifts and the initial and subsequent second anchored device time shifts to the receiver device with the first anchored device and the second anchored device; and determining with the receiver device a time difference of arrival between signals received from the first anchored device and the second anchored device based on the initial and subsequent first anchored device time shifts, the initial and subsequent second anchored device time shifts and the first, second third and fourth receiver time shifts.

32. The method of claim 31, wherein the first local ranging signal is a chirp signal.

33. The method of claim 32, wherein the first and second anchored devices are immobile and the receiver device stores data indicating locations of the first anchored device and the second anchored device.

34. The method of claim 33, further comprising:
transmitting a fourth local ranging signal from a third anchored device to the second anchored device and the receiver device when a fourth internal clock of the third anchored device reaches two specified times t1.5 and t3.5; and
determining with the receiver device a time difference of arrival between signals received from the third anchored device and the second anchored device based on the third local ranging signal and the two received fourth local ranging signals from the third anchored device and the two received second local ranging signals received from the second anchored device.

35. The method of claim 34, further comprising measuring receiver time shifts between the third local ranging signal and each of the two received fourth local ranging signals with the receiver device.

36. The method of claim 35, further comprising measuring third anchored device time shifts between the fourth local ranging signal and each of the two received second local ranging signals with the third anchored device, and measuring additional second anchored device time shifts between the second local ranging signal and each of the two received fourth local ranging signals with the second anchored device.

37. The method of claim 36, further comprising:
transmitting the third anchored device time shifts and the additional second anchored device time shifts to the receiver device with the third anchored device and the second anchored device; and
determining the time difference of arrival between the signals received from the third anchored device and the second anchored device with the receiver device based on the third anchored device time shifts, the additional second anchored device time shifts and the receiver time shifts.

38. The method of claim 37, further comprising determining a location of the receiver device with code executed by a processor of the receiver device based on the time difference of arrival between the first anchored device and the second anchored device and the time difference of arrival between the second anchored device and the third anchored device using multilateration.

39. The method of claim 38, wherein the time t1 is before the time t2 which is before the time t3 which is before the time t4.

40. The method of claim 39, wherein the first internal clock, the second internal clock and the third internal clock all generate the first local ranging signal, the second local ranging signal and the third local ranging signal, respectively, at each of the time slots.

41. The method of claim 40, wherein the times t1, t2, t3 and t4 are each at one of the time slots and the difference between the time t1 and the time t2 is the same as the difference between the time t3 and the time t4.

42. The method of claim 41, further comprising:
transmitting a timer-start packet to the second anchored device and the receiver device with the first anchored device while starting the first local clock with the first anchored device;
starting the second local clock upon receiving the timer-start packet with the second anchored device; and
starting the third local clock upon receiving the timer-start with the receiver device.

* * * * *

UNITED STATES PATENT AND TRADEMARK OFFICE
CERTIFICATE OF CORRECTION

| | |
|---|---|
| PATENT NO. | : 11,061,103 B1 |
| APPLICATION NO. | : 15/892092 |
| DATED | : July 13, 2021 |
| INVENTOR(S) | : Avi Zohar |

It is certified that error appears in the above-identified patent and that said Letters Patent is hereby corrected as shown below:

In the Specification

At Column 8, Line 55, please replace Equation 10, "$M_{a2}-M_{b4} = -2x(T_a-T_b) - (P_a-P_b) \times (t_2+t_4)$", with - $M_{a3}-M_{b4} = -2x(T_a-T_b) - (P_a-P_b) \times (t_3+t_4)$ -.

Signed and Sealed this
Twenty-sixth Day of April, 2022

Katherine Kelly Vidal
*Director of the United States Patent and Trademark Office*